United States Patent

[11] 3,577,972

[72] Inventor Forest J. Moray
 1513 Brooks Ave., Renton, Wash. 98055
[21] Appl. No. 52,175
[22] Filed July 6, 1970
[45] Patented May 11, 1971

[54] ADJUSTABLE VALVE STEM OIL SEAL FOR INTERNAL COMBUSTION ENGINES
 15 Claims, 13 Drawing Figs.
[52] U.S. Cl.................................................. 123/188P,
 277/112, 277/126, 277/153, 123/188GC
[51] Int. Cl...................................................... F01l 3/00,
 F16k 41/02
[50] Field of Search............................................ 123/188,
 188 (P), 188 (GCL); 277/33, 93, 112, 126, 153

[56] References Cited
 UNITED STATES PATENTS

| | | | |
|---|---|---|---|
| 59,837 | 11/1866 | Harsen.......................... | 266/34 |
| 1,586,613 | 6/1926 | Disch............................ | 308/5 |
| 1,683,902 | 9/1928 | Keessig......................... | 123/112 |
| 1,813,846 | 7/1931 | Goldsborough................ | 123/188P |
| 3,162,185 | 12/1964 | Knoblock...................... | 123/188P |

Primary Examiner—Wendell E. Burns
Attorney—Theron H. Nichols

ABSTRACT: The disclosed valve stem seal in the head of an internal combustion engine comprises a packing around a valve stem with a packing gland thereon. The latter comprises a sleeve screwed in the head and slideable around the valve stem with gripping means on the upper end of the packing gland. Various gripping means include several different types of circular plates fitting around the packing gland and keyed thereto. The several plates have on their periphery either recesses, straight radial projections, or arcuate projections for the rotation thereof. Also one packing gland has radial projections formed around the upper surface thereof for being rotated for adjustment and another packing gland is keyed to the valve stem and a gripping surface formed on the top of the valve stem for being rotated. All gripping means permit rotation of the packing gland for adjusting the pressure on the packing as the latter wears with friction and without requiring the removal of the valve spring, resulting in a great saving in time and expense. This provides greater inducement for maintaining the valve seals tight and leak proof for the elimination of the smog problem, carbon monoxide, engine sludge, and excess oil usage.

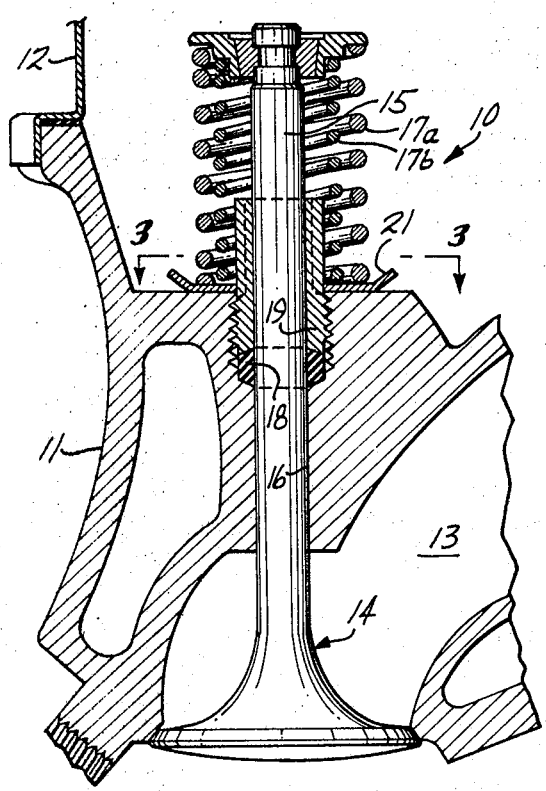
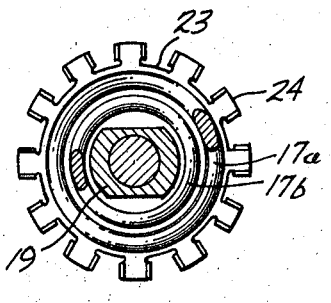
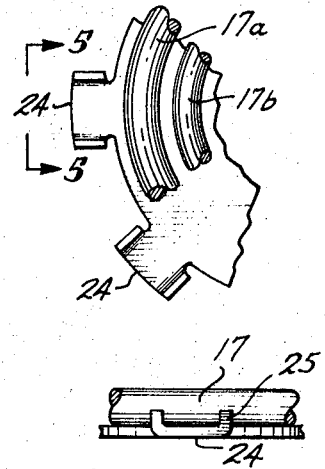
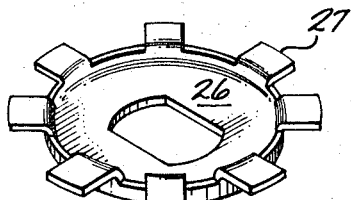
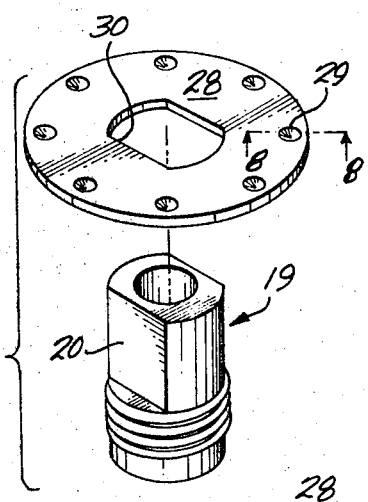
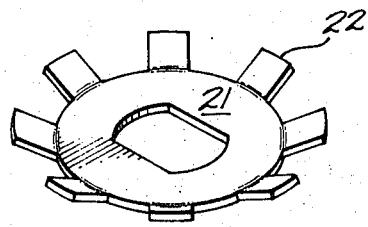
INVENTOR.
FOREST J. MORAY
BY
Theron H. Nichols
AGENT INVENTOR.
FOREST J. MORAY
BY
Theron H. Nichols
AGENT

ADJUSTABLE VALVE STEM OIL SEAL FOR INTERNAL COMBUSTION ENGINES

SUMMARY OF THE INVENTION

Overhead valves have become very popular in recent years, particularly in that they enable an engine to deliver more power from a given displacement (cylinder volume) as a result of better valve location.

In the overhead valve engine, to lubricate the rocker arms, rocker arm shafts, push rods, and especially the valve stems, oil must be pumped up to the top of the head and flows freely in all open spaces in the head. Also, on each intake stroke, the vacuum produced pulls in the air and fuel mixture. However, or unfortunately, this vacuum also pulls oil down the space between the valve guides and the valve stems and into the combustion chamber. This drawing of oil into the combustion chamber is undesirable for several reasons:

1. This oil leaking causes more hydrocarbons to be vented into the atmosphere, aggravating the smog problem for excessive oil in the combustion chamber produces an unnecessarily large amount of hydrocarbons in the exhaust gases. Hydrocarbons in the atmosphere are reacted upon by sunlight to produce photochemical smog. This type of smog is a severe nuisance in most of our large cities. Tests have verified that approximately 85 percent of the automotive smog is produced by cars over 5 years old. Since a great percentage of these cars on the road at the present time have overhead valves, it becomes imperative that a means be devised to control the amount of oil entering the combustion chamber by way of the valve guides of these overhead valve engines as the engine ages, without removing and reworking the heads.

2. This can cause detrimental detonations in the engine.

3. An abnormally large amount of oil entering the combustion chamber can more quickly deplete the oil supply in the sump, necessitating the replacement of oil at shorter intervals, at an added expense, and nuisance.

4. Excessive oil in the combustion chamber enriches the air-fuel mixture so that insufficient oxygen remains to completely burn all of the hydrocarbons. The result or byproduct of incomplete burning of hydrocarbons is the lethal gas carbon monoxide.

5. Another byproduct of internal combustion engines burning excessive rich mixture due to oil leaking in the cylinder is black engine sludge comprising mostly of carbon. This carbon is the result of the breaking down of the resultant hydrocarbons due to the heat of combustion. Due to the insufficiency of oxygen to burn all fuel, excessive carbon results and is washed past the rings by the gasoline into the sump to form sludge. When this sludge clogs up the engine oil passages, insufficient lubrication of vital moving parts results, for example when hydraulic valve lifters clog, valves are caused to burn due to insufficient valve openings.

These valves also require some effort for repairs, such as valve grinding, changing valve packing, etc. However, the overhead valves do adversely effect oil consumption and therefore the smog problem, particularly in that after a few years they become worn and begin to leak. Stopping this leak usually requires complete removal of everything down to and including the valve spring, if not the head and very valve itself.

This invention comprises a new packing gland valve seal, particularly for the overhead valves in an internal combustion engine, in which the valve packing is easily adjustable during the years of wear whereby the valve spring is not required to be removed. The disclosed seal is adjustable after the heads and valve springs are installed.

One method or device for carrying out the method comprises keying a plate to the upper portion of the packing gland and positioning the plate under the valve spring. The peripheral edge that protrudes out from under the valve spring has holes or radial projections, the latter being curved or straight.

Another method or device for carrying out the method comprises radial projections formed on the upper portion of the packing gland inside the head wherein a quadrant of the portion around the valve packing gland in the head is removed to expose a portion of the radial projections for being turned with a tool for adjusting the pressure on the packing by the packing gland.

Still another method, or device for carrying out the method comprises forming a flat side internally of the upper end of the valve packing gland and a flat side externally of the valve stem to match, and forming a flat sided top to the valve stem so that a tool may be used to rotate the top of the valve stem for adjusting the pressure on the packing by the packing gland without removing the valve spring.

Thus it is a principal object of this invention to provide a valve guide seal that is adjustable during the life of an internal combustion engine by only removing the rocker arm cover or the equivalent, and particularly not requiring removal of the valve and valve spring for adjusting the valve stem packing.

It is another principal object of this invention to provide a valve guide seal having a packing gland screwed in a recess around the valve stem for adjusting the pressure on a packing seal and which packing gland is adjustable from outside the valve spring whereby the pressure on the valve guide seal may be adjusted without removing the valve or valve spring.

Another object of this invention is to provide several methods for adjusting the pressure on valve guide seals without removing the valve or the valve spring.

Other objects and various advantages of the disclosed adjustable valve stem oil seal for internal combustion engines will be apparent from the following drawings, submitted for purposes of illustration only.

BRIEF DESCRIPTION OF THE FIGURES

The drawings diagrammatically illustrate by way of example, not by way of limitation, several forms of the invention wherein like reference numerals designate corresponding parts in the several views in which:

FIG. 1 is a schematic sectional view of the preferred embodiment of a valve stem oil seal on a valve in an internal combustion engine;

FIG. 2 is a schematic perspective view of the circular packing gland adjusting plate of FIG. 1;

FIG. 3 is a schematic top view of a modified gland adjusting plate;

FIG. 4 is a schematic enlarged portion of FIG. 3;

FIG. 5 is a schematic view taken at 5-5 on FIG. 4;

FIG. 6 is schematic isometric view of another modification of a plate for adjusting a packing gland;

FIG. 7 is a schematic exploded isometric view of another modification of a plate and a packing gland for being rotated by the plate;

FIG. 8 is a schematic view taken at 8-8 on FIG. 7;

Figure 9:
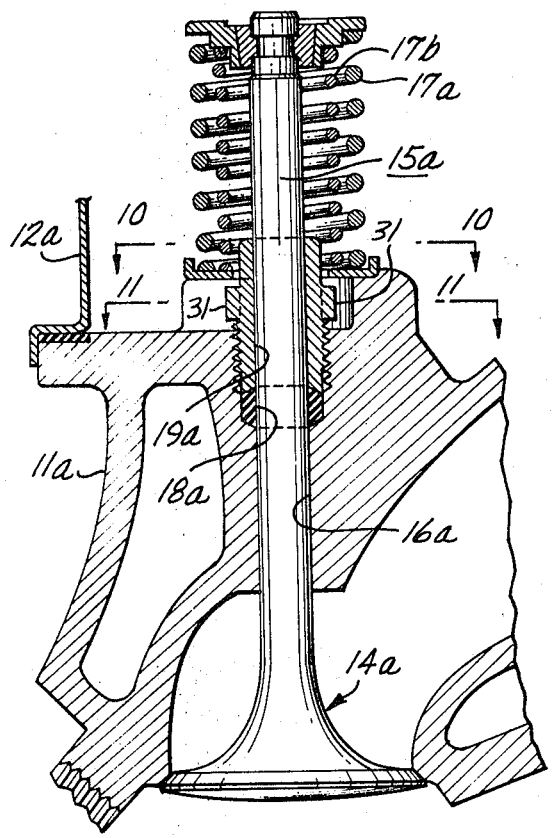
FIG. 9 is a schematic sectional view of another modification of FIG. 1.

The invention disclosed herein, the scope of which being defined in the appended claims, is not limited in this application to the details of construction and arrangement of parts shown and described, since the invention is capable of other embodiments and of being practiced or carried out in various other ways. Also it is to be understood that the phraseology or terminology employed herein is for the purpose of description and not of limitation.

The disclosed invention pertains to an adjustable valve stem oil seal for internal combustion engines. This new valve stem seal prevents excessive oil from being pulled into the combustion chamber of an overhead valve internal combustion engine by way of the space between the valve stem of a poppet valve and the valve guide in the engine head without disassembly of the valve assembly. This leakage problem relates particularly to intake valves of engines with overhead valves, but not necessarily solely to intake valves. Due to gravity and to the vacuum pulled in the cylinder during the intake stroke, undesired oil is forced into the combustion chamber along with the air-fuel mixture. A new engine presents few problems, but as an internal combustion engine becomes old, the oil seals in the valve guides around the valve stems become worn and permit unwanted oil to enter the combustion chamber. The result of the undesirable oil are:

1. Smog is generated by oil burning engines. An abnormally large amount of hydrocarbons in the exhaust gas is generated by excessive oil leaking into the combustion chamber. The hydrocarbons in the atmosphere are reacted upon by sunlight to produce photochemical smog. This type of smog is a great nuisance, particularly to our large cities.

2. Detrimental detonation may be caused by the improper air-fuel mixture due to excess oil.

3. Carbon monoxide is a byproduct of too rich an air-fuel mixture with insufficient oxygen in the combustion chamber to completely burn all of the hydrocarbons.

4. Black engine sludge results from excess carbon due to insufficient oxygen to burn all carbon.

5. Excessive oil burning quickly depletes the vital lubricating oil supply.

DESCRIPTION OF THE INVENTION

FIG. 1 illustrates the preferred embodiment of the invention schematically wherein an internal combustion, overhead valve engine 10 is illustrated as having head 11 with a valve cover 12, an intake 13 controlled by overhead intake valve 14 having a stem 15 slideable in valve guide 16 as controlled by valve springs 17a, 17b. Valve stem packing 18 fits snuggly between the valve stem 15 and valve guide 16.

The inventive features comprise a packing gland 19, FIGS. 1 and 7, screwed in the head around the valve stem to adjustably press on packing 18, FIG. 1. The top portion of packing gland 19, FIG. 7, has one or more flat surfaces 20 on which is nonrotatably fitted the preferred plate 21, FIGS. 1 and 2. Plate 21, FIG. 1, which rests on the engine head under valve springs 17a, 17b, has straight radial prongs 22 around the periphery of the plate.

After the valve cover 12 is removed, a simple tool as a screw driver is used to push the pronged plate 21 around, rotating packing gland 19 and adjusting the pressure in an axial direction on packing seal 18 to ensure proper sealing capabilities of the packing. Removal of the valve springs 17a, 17b, or the valve 14 is not required.

FIGS. 3—5 illustrate a modification of FIG. 1, wherein the plate 23, FIG. 3, has prongs 24 with radial extending edges 25 being curved about radial axes as shown particularly in FIG. 5. Thus plate 23, FIG. 3, may be combined with the packing gland 19 and seal 18 of FIG. 1 to form a modified valve seal.

FIG. 6 discloses a modification of FIG. 1 wherein plate 26 has prongs 27 curved about a peripheral or circumferential axis. Plate 26 is combined with the packing gland 19 and seal 18 of FIG. 1 to form another modification of FIG. 1.

FIGS. 7 and 8 show another modification of FIG. 1 wherein the plate 28 has recesses 29 for receiving a tool such as a punch for turning the plate, which plate has a flat sided opening 30 for sliding snuggly and nonrotatably over packing gland 19 so as to be rotatable by plate 28 for adjusting the pressure on packing 18. Plate 28 is combined with the packing gland 19 and seal 18 of FIG. 1 to form another modification of FIG. 1.

Figure 10:
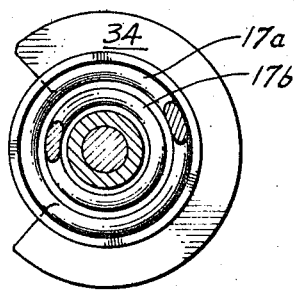
FIG. 10 is a schematic view taken at 10-10 on FIG. 9.
Figure 11:
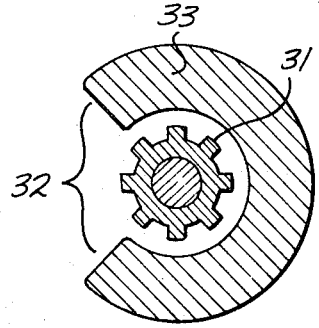
FIG. 11 is a schematic view taken at 11-11 on FIG. 9.

FIGS. 9, 10, and 11 illustrate a modification of FIG. 1 wherein valve 14a, FIG. 9, has valve stem 15a slideable in head 11a with packing 18a compressed by packing gland 19a. The latter has radial projections 31, FIG. 11, a sectional view at 11—11 on FIG. 1, for rotating the packing gland 19a with a tool, such as a screw driver, or the like, which is accessible to the projections through a cutout quadrant 32 of the portion 33, FIG. 11, around the valve packing gland 19a, FIG. 9, in the head which supports the three quarters plate 34, FIG. 10, for the valve springs 17a and 17b, FIG. 9. FIG. 10 is a sectional view taken at 10—10 on FIG. 9. Thus again, only valve cover 12a need be removed and the packing gland rotated for adjusting the pressure on packing 18a.

Figure 12:
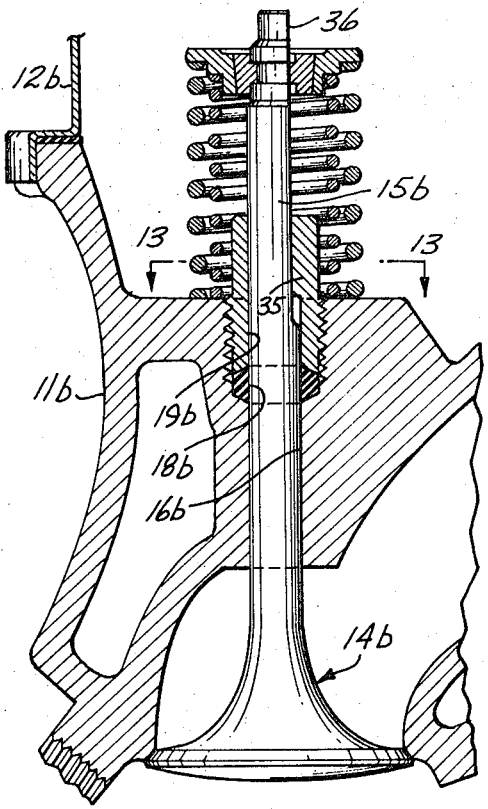
FIG. 12 is a schematic view of another modification of FIG. 1.
Figure 13:
FIG. 13 is a schematic view taken at 13-13 on FIG. 12.

FIGS. 12 and 13 disclose a modification of FIG. 1 wherein head 11b, FIG. 12, has valve cover 12b over valve 14b which is slideably connected to packing gland 19b with key or spline 35, and corresponding flat sides on both the valve stem and packing gland as illustrated in FIG. 13, a section at 13—13 on FIG. 12. The packing gland being screwed in valve guide 16b of the head 11b and with a flat surface 36 formed on the upper end of valve stem 15b, a tool may rotate the upper end of valve stem with flat 36 for screwing packing gland 19b up or down for adjusting the pressure on packing 18b.

Thus it will be seen that the instant valve seal for an internal combustion engine is very effective and easy to adjust by only removing the valve cover and operable in a manner which meets each of the objects set forth hereinbefore.

While only a few embodiments of the invention have been shown in the accompanying specification and drawings, it will be evident that various other modifications are possible in the arrangement and construction of the disclosed adjustably valve stem oil seal without departing from the scope of the invention, and it is accordingly desired to comprehend within the purview of this invention such modifications as may be considered to fall within the scope of the appended claims.

I claim:

1. A seal for a valve stem in the head of an internal combustion engine wherein the engine head has a recess around the valve stem for a packing and the valve has a valve spring thereon, the seal comprising,
   a. packing in the recess in the head of the engine around said valve stem,
   b. a packing gland screwed in said recess around said valve stem down against said packing, and
   c. gripping means formed on one end of said packing gland and extending externally of said valve spring for being easily rotated for axial movement without having to remove the valve spring from said valve for adjusting said packing tight in said recess for prevention of excessive oil leakage around said valve stem.

2. A seal as recited in claim 1 wherein, said gripping means comprises means for facilitating the rotation of said packing gland with a tool for adjustment of said packing without removing said valve spring.

3. A seal as recited in claim 1 wherein, said gripping means comprises the upper end of said valve stem nonrotatably connected to said packing gland for adjustment thereof without having to remove the valve spring.

4. A seal as recited in claim 1 wherein, said head of said internal combustion engine having a cutout for exposing a portion of said packing gland gripping means for facilitating adjustment of said packing gland.

5. A seal as recited in claim 1 wherein, said gripping means comprises projections extending radially from said packing gland for facilitating rotation of said gland for adjustment thereof.

6. A seal as recited in claim 5 wherein, the head of said internal combustion engine has a cutout for exposing a portion of said radial projections for facilitating adjustment of said packing gland.

7. A seal as recited in claim 1 wherein,
   a. a flat surface is formed on one of the ends of said packing gland, and
   b. said gripping means comprising means for contacting said packing gland flat surface for rotating said packing gland for movement in an axial direction for adjusting the pressure on said packing without having to remove the valve spring.

8. A seal as recited in claim 7 wherein, a. said packing gland gripping means comprises a plate circumscribing said packing gland with an internal flat side matching said flat surface of said packing gland, and
b. said plate having prongs radiating outwardly from the periphery of said plate externally of said valve spring for being contacted with a tool for rotating said packing gland independently of said valve spring.

9. A seal as recited in claim 7 wherein, said gripping means for contacting said packing gland flat surface comprises one of the ends of said valve stem for adjusting the pressure on said packing without having to remove the valve spring.

10. A seal as recited in claim 7 wherein,
a. said packing gland gripping means comprises a plate circumscribing said packing gland and having an internal flat side matching said flat side of said packing gland, and
b. means for facilitating rotation of said plate, said rotating means being positioned about the periphery of said plate for rotating said packing gland without removing said valve spring.

11. A seal as recited in claim 10 wherein, said means for facilitating rotation of said plate comprises projections from the periphery of said plate.

12. A seal as recited in claim 10 wherein, said means for facilitating rotation of said plate comprises projections extending straight from the periphery of said plate.

13. A seal as recited in claim 10 wherein, said means for facilitating rotation of said plate comprises arcuate projections radiating from the periphery of said plate.

14. A seal as recited in claim 10 wherein, said means for facilitating rotation of said plate comprises flat projections extending straight from the periphery of said plate.

15. A seal as recited in claim 10 wherein, said means for facilitating rotation of said plate comprises recesses in said plate at the periphery thereof.